United States Patent

[11] 3,625,166

| [72] | Inventor | Morris I. Woodley<br>R.R. 3, Hampton, Iowa 50441 |
| --- | --- | --- |
| [21] | Appl. No. | 37,613 |
| [22] | Filed | May 15, 1970 |
| [45] | Patented | Dec. 7, 1971 |

[54] VOLATILE LIQUID KNIFE APPLICATOR
7 Claims, 4 Drawing Figs.

| [52] | U.S. Cl. | 111/7 |
| --- | --- | --- |
| [51] | Int. Cl. | A01c 23/02 |
| [50] | Field of Search | 111/6, 7 |

[56] References Cited
UNITED STATES PATENTS

| 2,849,970 | 9/1958 | Coberley et al. | 111/7 |
| 3,237,577 | 3/1966 | Wilkins | 111/7 |
| 3,296,985 | 1/1967 | Shelton | 111/7 |

*Primary Examiner*—Robert E. Bagwill
*Attorney*—Henderson & Strom

ABSTRACT: A knife applicator for applying volatile liquids to the soil is provided herein. The knife applicator is comprised of a shank securable to a tool bar and a leading knife formed on the shank for opening a slit in the ground. Side shields extend rearwardly of the knife and a flexible hose extends downwardly between these shields. A hose support member is affixed between opposite side shields and maintains the hose in the ground. The hose extends rearwardly of the side shields a sufficient distance to prevent icing of the side shields. In a preferred embodiment, a link chain is secured above the hose and extends rearwardly of the hose to facilitate sealing the volatile liquids in the ground.

PATENTED DEC 7 1971
3,625,166
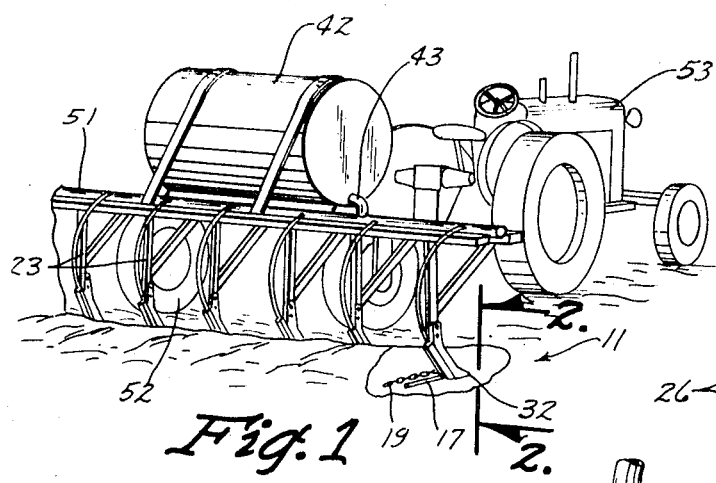
Fig. 1
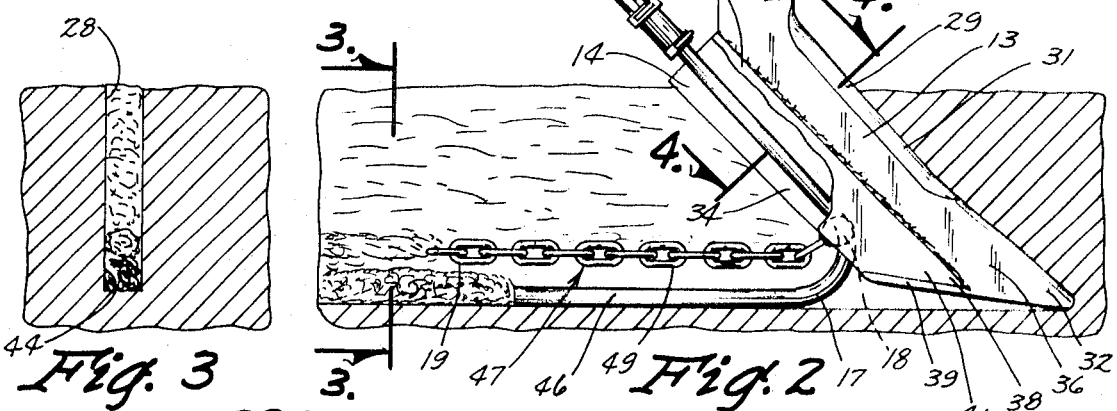
Fig. 3
Fig. 2
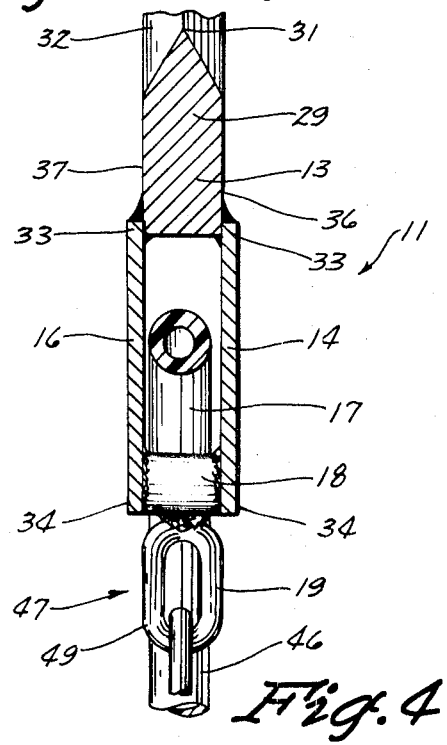
Fig. 4
INVENTOR
MORRIS I. WOODLEY
BY
Henderson & Strom
ATTORNEYS

VOLATILE LIQUID KNIFE APPLICATOR

BACKGROUND OF THE INVENTION

This invention relates to a knife applicator for applying volatile liquids, such as anhydrous ammonia, to the soil.

Nitrogen is one of several necessary fertilizer elements. Few plants can utilize the abundant free nitrogen in the atmosphere and must, therefore, obtain the necessary nitrogen from the soil. To obtain maximum crop yields, nitrogen must be introduced on a regular basis into the soil.

Typically, the soil is impregnated with anhydrous ammonia to supply the necessary nitrogen to the soil. Several devices have been utilized to impregnate soil with anhydrous ammonia with varying degrees of success. These devices are illustrated in Bell, U.S. Pat. No. 2,619,054; Leavitt, U.S. Pat. No. 2,285,932; Harbolt, U.S. Pat. No. 2,272,190; Hannibal, U.S. Pat. No. 2,598,121; McEwen, U.S. Pat. No. 2,439,743; Tonkin, U.S. Pat. No. 2,424,520; and Bickerton, U.S. Pat. No. 2,509,627.

Anhydrous ammonia is very volatile and, when released from the hose under ground, absorbs heat very rapidly while vaporizing. This rapid vaporization can cause icing on the knife or plow blade and the moist earth, therefore, freezes to the knife. Because of the earth clinging to the knife, a wider than desired furrow is opened in the soil, with the above prior art devices, allowing the vaporized ammonia to escape therefrom. Additionally, the prior art devices generally utilize metal hoses for the anhydrous ammonia. When the knife is backed out of the soil, these hoses can readily be sheared off.

The volatile liquid, knife applicator of this invention represents an important improvement which is utilized to alleviate the above problems. This applicator is simple in construction, durable and dependable and alleviates icing on the applicator. It also provides a simple and economical method of sealing the furrow to prevent escape of the volatile liquids therefrom.

SUMMARY OF THE INVENTION

This invention relates to a volatile liquid, knife applicator for applying volatile liquids to the soil. The knife applicator comprises a rigid, normally upright shank and a leading knife formed on the lower end of the shank and extending forwardly of the shank at an oblique angle. Side shields are secured to each side of the leading knife and extend rearwardly thereof. A hose support member is affixed between the side shields above the lowermost portion of the side shields and proximate the trailing edges of the side shields. A flexible hose for carrying the volatile liquid extends from the source of supply, between the side shields, and forwardly of the hose support member; the end of the hose trails the side shields by a sufficient distance to prevent freezing temperatures at the side shields.

It is an object of this invention to provide a knife applicator having a unique construction for applying volatile liquids to the soil.

Another object is to provide a knife applicator wherein the vaporizing of the liquid will not cause icing of the leading knife or side shields.

A further object is to provide a knife applicator which effectively seals the nitrogen in the soil.

Still another object is to provide a knife applicator which can readily be backed out of the soil without shearing off the hoses or other portions of the knife applicator.

BRIEF DESCRIPTION OF THE DRAWINGS

FIG. 1 is a perspective view of the knife applicators of this invention secured to a tool bar. A portion of the soil is cut away to illustrate the function of the applicator in the soil.

FIG. 2 is a side view of the knife applicator taken along line 2—2 of FIG. 1.

FIG. 3 is a cross-sectional view of the soil behind the knife applicator taken along line 3—3 of FIG. 2.

FIG. 4 is a cross-sectional view of the knife applicator taken along line 4—4 of FIG. 3.

DESCRIPTION OF THE PREFERRED EMBODIMENTS

Referring now to the drawings, the knife applicator of this invention is indicated generally at 11 in FIGS. 1 and 2. The applicator 11 is comprised of a shank 12 having a leading knife 13 formed on the lower end thereof. Two side shields 14 and 16 (FIGS. 2 and 4) are secured to said leading knife 13 and extend rearwardly thereof. A hose 17 extends downwardly between the side shields 14 and 16 and is maintained in proper position by a hose support member 18 secured between the side shields 14 and 16. A flexible chain 19 is secured above the hose 17 and facilitates sealing the soil thus preventing escape of the anhydrous ammonia.

More specifically, the shank 12 (FIG. 2) is of rigid construction and is normally disposed in an upright manner. Means 21 are formed on the upper end 22 of the shank 12 for securing the shank 12 to a tool bar 23 or the like (FIGS. 1 and 2). Usually, the means 21 comprises a series of spaced holes 24 which are alignable with holes (not shown) formed in the tool bar 23. The shank 12 is secured to the tool bar 23 by nuts and bolts 26.

The leading knife 13 (FIGS. 2 and 4) is formed from steel or other rigid material and is generally integrally formed with the shank 12. The leading knife 13 is secured to the lower end 27 of the shank 12 and extends forwardly of the shank 12 at an oblique angle. The leading knife 13 is secured to the lower end 27 of the shank 12 at an oblique angle. The leading knife 13 is of generally planar configuration as it is desirable to only open a slit 28 (FIG. 3) in the soil.

The uppermost portion 29 of the leading edge 31 (FIG. 4) is formed into a sharpened wedge, for example, by grinding. This uppermost portion 29 of the knife 13 cuts through the soil readily but does not leave a large furrow from which the anhydrous ammonia can escape. The lowermost portion 32 or toe is generally not sharpened and is utilized to provide a path for the hose 17 to follow.

Side shields 14 and 16 (FIGS 2 and 4), each having a leading edge 33 and a trailing edge 34, are secured to opposite sides 36 and 37 of the leading knife 13, as by welding. The side shields 14 and 16 are secured by their leading edges 33 with the trailing edges 34 extending rearwardly. As shown in FIG. 4, the side shields 14 and 16 are spaced apart to protect the hose 17 and are of substantially the same length as the leading knife 13 (FIG. 2). The side shields 14 and 16, like the leading knife 13, are of essentially planar configuration.

Preferably, the side shields 14 and 16 are joined together at the lowermost ends 38 thereof (FIG. 2). A metal insert 39 can be welded between the side shields 14 and 16 to form the heel 41 of the applicator 11 and prevent soil from forcing the hose 17 out of the soil. It is preferred that the heel 41 be slightly above the toe 32 as shown in FIG. 2.

A hose support member 18 is affixed between the side shields 14 and 16. The hose support support member 18 is spaced above the lowermost ends 38 of the side shields 14 and 16 and proximate the trailing edges 34 of the side shields 14 and 16. Preferably, the hose support member 18 is of substantially cylindrical configuration and horizontally disposed. It is generally affixed by welding the hose support member 18 to opposite side shields 14 and 16.

A flexible hose 17 (FIGS. 1, 2 and 4) is provided for carrying the volatile liquid from the storage tank 42 to the soil. The amount of volatile liquid flowing through the hose 17 is controlled by a regulating valve 43.

The hose 17 extends downwardly from the valve 43 and between the side shields 14 and 16 and forwardly of the hose support member 18. In use (FIGS. 1 and 2), the hose 17 extends forwardly of the hose support member 18 and trails the side shields 14 and 16 and leading knife 13 by a sufficient distance to prevent freezing temperatures. The hose 17 rides in the groove 44 formed by the toe 32 of the leading knife 13. The distance the hose 17 trails to prevent freezing must be at least 5 inches and, more preferably, is from 6 to 8 inches.

The hose 17 is preferably constructed of abrasion-resistant polyethylene or the like. The hose 17 or at least that portion 46 which trails the side shields 14 and 16 must be flexible to allow the applicator 11 to be backed out of the soil at the end of fields or when a job is completed.

A flexible, pulverizing means 47 is secured to either the hose support member 18 or the trailing edges 34 of the side shields 14 and 16. This pulverizing means 47 breaks up the soil into smaller particles which, in turn, trap the anhydrous ammonia or other volatile liquid as it is released from the hose 17 (see FIG. 3).

In a preferred embodiment, the pulverizing means 47 is a link chain 19 welded or otherwise secured to the hose support member 18. The link chain 19 is preferably longer than the hose 17 and, in use (FIGS. 1 and 2), rides above the hose 17. The chain 19 can twist and turn in the slit 28 in the soil and thereby remove any soil which clings thereto.

The chain 19 should be of substantial construction. Each link 49 should have a width approximately equal to the width of the leading knife 13 to attain maximum pulverizing capability. Additionally, the links 49 should not be excessively long as excessive length limits the pulverizing action.

The knife applicators 11 described hereinbefore are generally mounted on a tool bar 23 (FIG. 1) which is carried by a support means 51. Generally, the support means 51 is equipped with wheels 52 and a hitch (not shown) for attaching the support means 51 to a tractor 53.

Mounted on the support means 51 (FIG 1) is a storage tank 42 for carrying volatile liquids such as anhydrous ammonia. A regulating valve 43 communicates with the storage tank 42 and the hose 17.

As the tractor 53 pulls the support means 51 through the field, anhydrous ammonia is released in the groove 44 behind the applicator 11. The chain 19 pulverizes the soil and minimizes the escape of the volatile liquid (FIG. 3).

Although a preferred embodiment has been described herein, it is to be remembered that various modifications may be made without departing from the invention as defined in the appended claims.

I claim:

1. A volatile liquid, knife applicator for applying volatile liquids to the soil comprising:
   a shank of rigid construction normally disposed in an upright manner;
   a leading knife of rigid construction formed on the lower end of said shank and extending forwardly of said shank at an oblique angle;
   side shields having a leading edge and a trailing edge secured to each side of said leading knife at said leading edge and extending rearwardly thereof; said side shields being of substantially the same length as said leading knife;
   a hose support member affixed between said side shields, said hose support member being spaced above the lowermost ends of said side shields and proximate said trailing edges of said side shields; and
   a flexible hose for carrying the volatile liquid extending downwardly between said side shields and forwardly of said hose support member, the end of said hose trailing said side shields a sufficient distance to prevent freezing temperatures at said side shields.

2. The volatile liquid, knife applicator of claim 1 wherein a flexible pulverizing means is secured to said hose support member.

3. The volatile liquid, knife applicator of claim 2 wherein said flexible pulverizing means is a link chain, said link chain extending rearwardly of said flexible hose.

4. The volatile liquid, knife applicator of claim 3 wherein said side shields are joined together at the lowermost ends thereof.

5. The volatile liquid, knife applicator of claim 4 wherein means for securing said shank to a tool bar are formed on said shank; and
   said leading knife is of substantially planar configuration.

6. The volatile liquid, knife applicator of claim 5 wherein said flexible hose trails said side shields by at least 5 inches.

7. In a device for applying volatile liquids to the soil comprising a support means, a tool bar, a volatile liquid storage tank, and volatile liquid regulating valves communicating with the tank, the improvement consisting of volatile liquid, knife applicators, each of said applicators comprising:
   a rigid, normally upright shank secured to said tool bar;
   a rigid leading knife formed on the lower end of said shank and extending forwardly of said shank at an oblique angle;
   side shields secured to each side of said leading knife and extending rearwardly thereof; said side shields being of substantially the same length as said leading knife;
   a hose support member affixed between said side shields, said hose support member being spaced above the lowermost ends of said side shields and proximate the trailing edges of said side shields; and
   a flexible hose for carrying the volatile liquid extending from the regulating valves downwardly between said side shields and forwardly of said hose support member, the end of said hose trailing said side shields a sufficient distance to prevent freezing temperatures at said side shields, and
   a flexible pulverizing means secured to said hose support member and extending rearwardly of said flexible hose.

* * * * *